United States Patent [19]

Thomas

[11] 4,313,061

[45] Jan. 26, 1982

[54] METHOD AND APPARATUS FOR SUPPLYING ELECTRIC CURRENT TO A NUMBER OF ELECTRICAL LOADS

[76] Inventor: Donald G. Thomas, P.O. Box 31, Lyons, Australian Capital Territory, Australia

[21] Appl. No.: 20,134

[22] Filed: Mar. 13, 1979

[30] Foreign Application Priority Data

Mar. 14, 1978 [AU] Australia .................. PD3714

[51] Int. Cl.³ .................. H02J 5/00; H02M 7/155
[52] U.S. Cl. .................. 307/32; 307/41; 307/115; 323/267; 323/319; 323/350
[58] Field of Search .................. 307/36, 12, 34, 38, 307/41, 115, 31, 32, 33, 35; 315/318, 319, 323; 323/25

[56] References Cited

U.S. PATENT DOCUMENTS 4,010,412  3/1977  Forman .................. 307/41
4,037,135  7/1977  Novey .................. 323/25

*Primary Examiner*—L. T. Hix
*Assistant Examiner*—Stafford D. Schreyer
*Attorney, Agent, or Firm*—Sughrue, Mion, Zinn, Macpeak and Seas

[57] ABSTRACT

A method and circuit as disclosed herein for varying the current to N electrical loads by the use of SCR's, the arrangement being such that the total current is sinusoidal and of uniform amplitude at a particular setting. The technique involves the steps of generating a load sequence waveform, the period of which is nN full cycles of the ac source where n is any positive integer, and, during each period of the waveform, generating a load firing pattern for initiating the flow of a current I in each load, the load pattern being such that (a) the currents in each of the loads are initiated at instants which are n full cycles of the ac source apart, and (b) maintaining the current in each load for d full cycles of the ac source, where d is a duty factor and is any positive integer equal to or greater than n, but less than or equal to nN, whereby the total current drawn from the ac source is uniform and equal to dI/n.

11 Claims, 7 Drawing Figures

STATES OF BITS OF SHIFT REGISTER 72

|    | 1 | 2 | 3 | 4 | 5 | 6 | 7 | 8 | 9 | 10 |
|----|---|---|---|---|---|---|---|---|---|----|
| 1  | 1 | 1 | 1 | 1 | 0 | 0 | 0 | 0 | 0 | 0  |
| 2  | 0 | 1 | 1 | 1 | 1 | 0 | 0 | 0 | 0 | 0  |
| 3  | 0 | 0 | 1 | 1 | 1 | 1 | 0 | 0 | 0 | 0  |
| 4  | 0 | 0 | 0 | 1 | 1 | 1 | 1 | 0 | 0 | 0  |
| 5  | 0 | 0 | 0 | 0 | 1 | 1 | 1 | 1 | 0 | 0  |
| 6  | 0 | 0 | 0 | 0 | 0 | 1 | 1 | 1 | 1 | 0  |
| 7  | 0 | 0 | 0 | 0 | 0 | 0 | 1 | 1 | 1 | 1  |
| 8  | 1 | 0 | 0 | 0 | 0 | 0 | 0 | 1 | 1 | 1  |
| 9  | 1 | 1 | 0 | 0 | 0 | 0 | 0 | 0 | 1 | 1  |
| 10 | 1 | 1 | 1 | 0 | 0 | 0 | 0 | 0 | 0 | 1  |
| 1  | 1 | 1 | 1 | 1 | 0 | 0 | 0 | 0 | 0 | 0  |

TIME

METHOD AND APPARATUS FOR SUPPLYING ELECTRIC CURRENT TO A NUMBER OF ELECTRICAL LOADS

This invention relates to a method and apparatus for supplying current to a number of electrical loads.

The object of the invention is to provide a method and apparatus for varying the amount of current supplied to the number of electrical loads from an ac source in such a manner that the total current drawn from the source is uniform. In the case of a sinusoidal source, the total current drawn is a substantially sinusoidal current of a uniform value. This avoids drawing non-sinusoidal components from the source which non-sinusoidal components are known to cause undesirable disturbances on the ac supply.

According to the present invention, there is provided a method of supplying current to N electrical loads from an ac source comprising the steps of generating a load sequence waveform, the period of which is nN full cycles of the ac source where n is any positive integer, and, during each period of the waveform, generating a load firing pattern for initiating the flow of a current I in each load, the load pattern being such that (a) the currents in each of the loads are initiated at instants which are n full cycles of the ac source apart, and (b) maintaining the current in each load for d full cycles of the ac source, where d is a duty factor and is selected to be any positive interger equal to or greater than n, but less than or equal to nN, whereby the total current drawn from the ac source is variable in magnitude in accordance with the selected value of d, is uniform and is equal to dI/n.

The invention also provides a circuit for supplying current to N electrical loads from an ac source of frequency fHz, said apparatus comprising a plurality of switching elements couplable between the source and loads, first generating means for generating a load sequence waveform having a period of nN full cycles of the ac source where n is any positive integer, second generating means coupled to the first generating means for generating control signals for the switching elements during each load sequence period, said control signals being operable to (a) successively render the elements conductive at instants which are n full cycles of the ac source apart whereby currents I are successively initiated in the said loads, and (b) maintaining the elements conductive for d full cycles of the ac source where d is a selectable duty factor and is greater than or equal to n, but less than or equal to nN whereby the total current from the source to the N loads is variable in magnitude in accordance with the selected value of d, is uniform and is equal to dI/n.

The invention will now be further described with reference to the accompanying drawings, in which;

FIG. 5 illustrates the states of a shift register forming part of the circuitry of FIG. 2 as a function of time;

Figure 1:
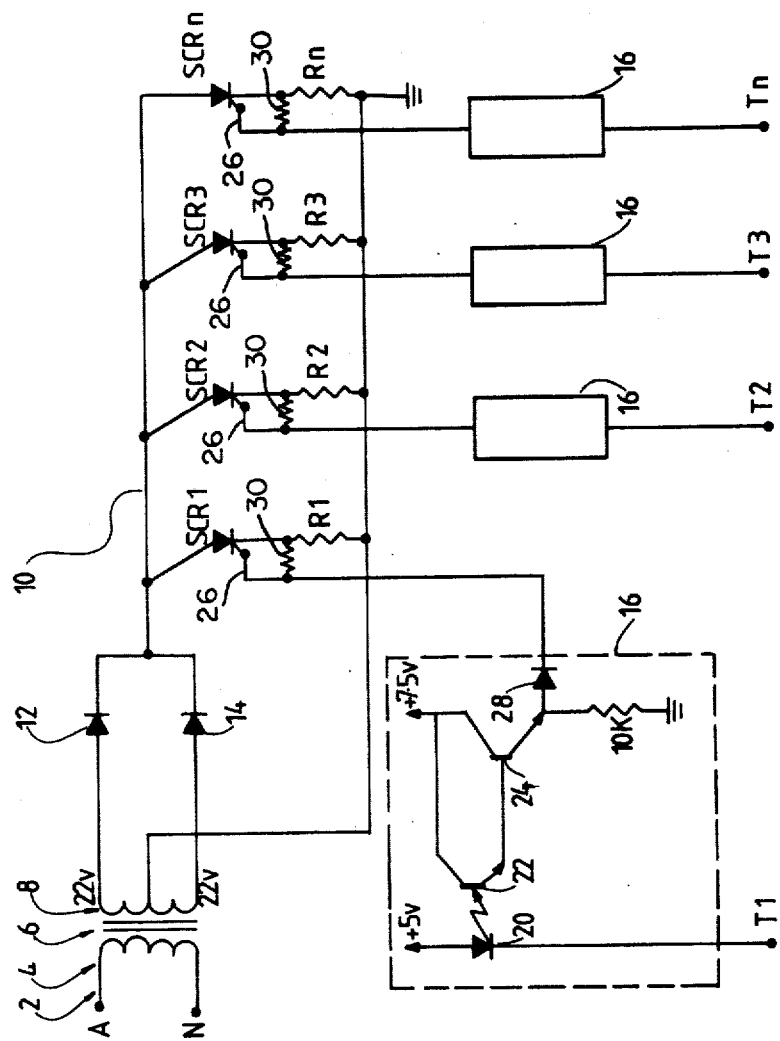
FIG. 1 is a circuit diagram showing a number of electrical loads $R_1$ to $R_N$, the currents which are controlled by the circuitry of the invention.

Referring first to FIG. 1, there is shown a circuit arrangement for supplying current to a number of resistive loads $R_1$ to $R_N$ from a main supply 2. For the purpose of the following description, the supply 2 will be assumed to be a 50 cycle sinusoidal voltage but this is not essential. In addition, the number of loads is ten, i.e. N=10. The supply 2 is connected to the primary winding 4 of a transformer 6, the secondary winding 8 of which is center tapped to earth and the ends of the winding are connected to a rectified current rail 10 via diodes 12 and 14. The loads $R_1$ to $R_N$ are connected in parallel from the rail 10 to earth via respective $SCR_1$ to $SCR_{10}$. Triggering pulses for the SCR's are fed from the circuit shown in FIG. 2 via respective coupling circuits 16, one of which is illustrated in greater detail in FIG. 1.

Briefly, the coupling circuits 16 comprise a light emitting diode 20 located adjacent to a photo transistor 22 the output of which is amplified by a transistor 24 and applied to the gate electrode 26 via a diode 28. The conductivity of the diodes 20 is determined by the voltage level of terminals $T_1$ to $T_N$ which are connected to corresponding terminals $T_1$ to $T_N$ connected to the output of the N NAND gates 32, FIG. 2.

Figure 2:
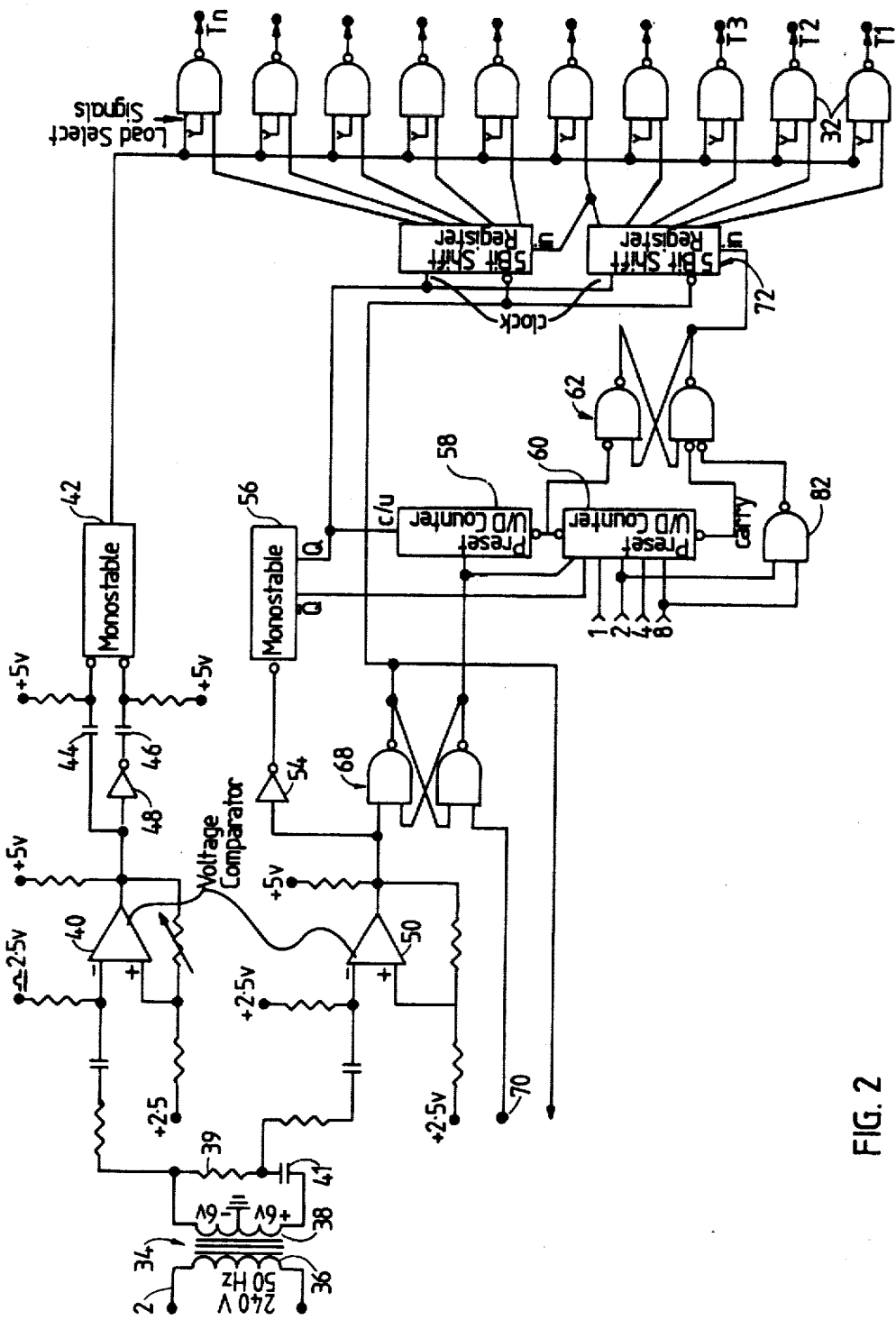
FIG. 2 is a circuit diagram showing the principal sequencing circuitry of the invention.

The circuitry illustrated in FIG. 2 is designed such that the outputs of the NAND gates 32 control the firing of respective SCR's in such a manner that the total current flowing from the supply 2 into the transformer 6, FIG. 1 is substantially sinusoidal regardless of the duty cycle of the respective loads $R_1$ to $R_N$. In this way, the total power into the loads is variable and yet the current drawn from the supply is always sinusoidal. Normally all of the loads $R_1$ to $R_N$ will be operated during a complete cycle, the duration of current flow in each load determining the duty cycle. Additionally load selecting signals could be applied to inputs of gates 32 to control which of the loads $R_1$ to $R_N$ can be brought into operation.

Referring now more particularly to FIG. 2, the circuit includes a transformer 34, the primary winding 36 of which is connected to the supply 2. The secondary winding 38 is centre tapped to earth and the ends of the secondary winding 38 is connected across a resistor 39 and capacitor 41 having substantially equal impedance at the supply frequency, however, the voltage with respect to earth at the upper terminal of the resistance 39 is in phase with the supply 2 whereas the voltage at the junction of resistance 39 and the capacitor 41 leads by 90 degrees with respect to the supply 2. Voltage from the upper terminal of resistance 39 is applied to one input of a voltage comparator 40, the other input of which is connected to a reference source and the comparator is arranged to produce a square wave output which is substantially in phase with the supply 2. Output from the voltage comparator 40 is applied to a first input of a monostable multivibrator 42 via a coupling capacitor 44 and to a second input of the multivibrator 42 via a coupling capacitor 46 and inverter 48. Thus, the output from the multivibrator 42 thus produces a pulse 1.2 milliseconds wide symmetrically disposed relative to each zero crossing of the main supply 2, i.e., the pulses from the multivibrator 42 are generated at ten millisecond intervals. The output from the multivibrator 42 is connected to one input of each of the NAND gates 32 and thus the NAND gates 32 can only change state in synchronism with zero crossings of the main supply.

Figure 4:
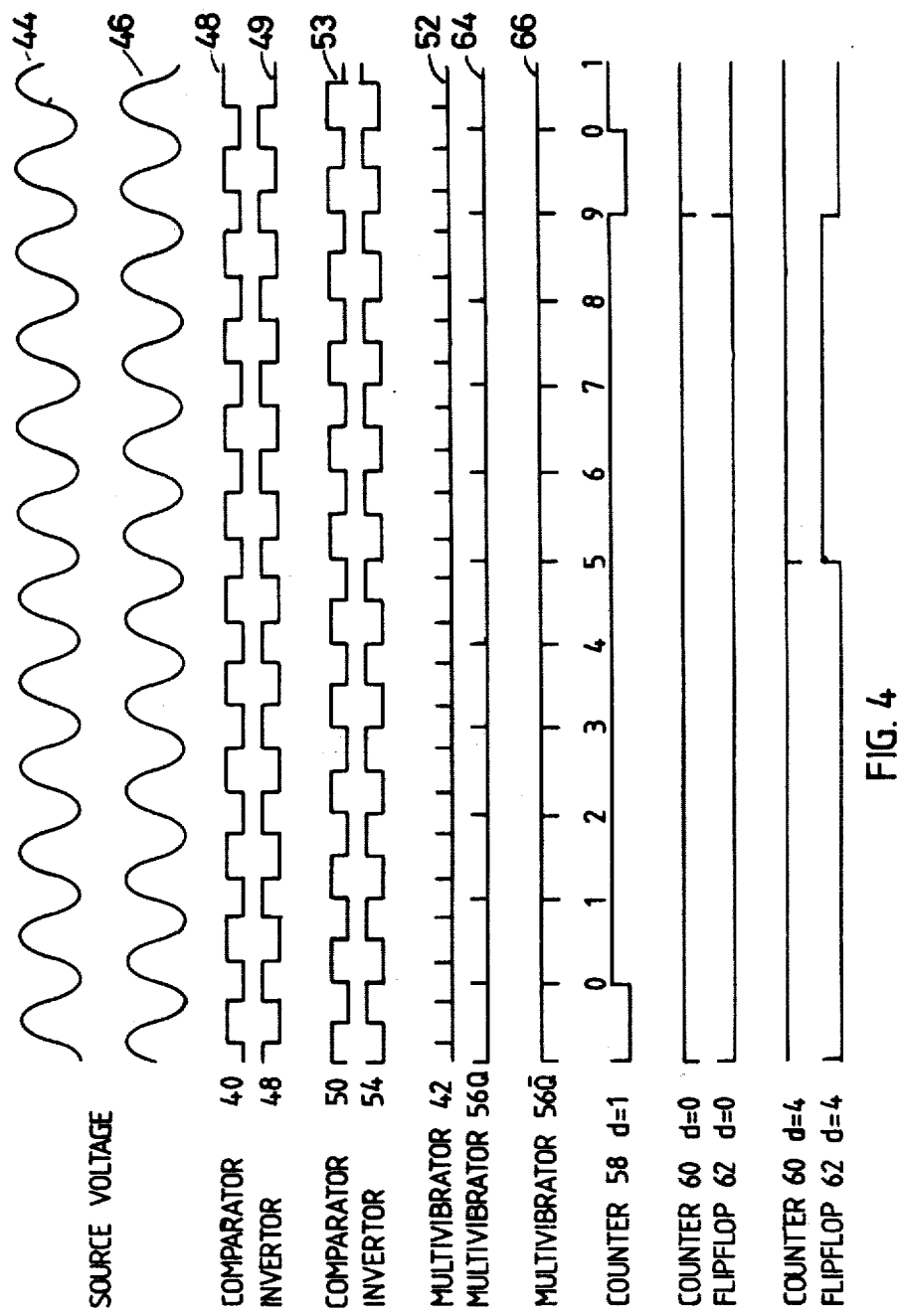
FIG. 4 illustrates a number of waveforms useful in understanding the circuit shown in FIG. 2.

FIG. 4 diagrammatically illustrates the relationship of some of the waveforms appearing in the circuit of FIG. 2. In particular, the waveform 44 represents the voltage at the upper terminal of the resistance 39 which voltage is in phase with the main supply. The waveform 46 represents the waveform with respect to earth at the junction of resistance 39 and the capacitor 41 which voltage leads the mains supply by 90°. The waveform 48 represents the output of the comparator 40 which is a square wave in phase with the positive half cycles of the mains supply. The waveform 49 represents the inverted waveform from the inverter 48. The waveform 52 represents the output pulses from the multivibrator 42, these pulses occurring in synchronism with the zero crossings of the main supply.

The leading voltage appearing at the junction of resistance 39 and the capacitor 41 is applied to one input of a second voltage comparator 50, the other input of which has a reference voltage applied thereto. The comparator 50 thus produces a square wave in synchronism with the positive half cycles of the leading voltage waveform as represented by the waveform 53 in FIG. 4. The output from the comparator 50 is inverted in an inverter 54 and applied to the input of a monostable multivibrator 56, the Q output of the multivibrator 56 is applied to the input of an up-down counter 58, the carry output of which is connected to the load input of a preset up-down counter 60, the input of which is connected to the $\overline{Q}$ output of the multivibrator 56. The output waveforms appearing at the Q and $\overline{Q}$ outputs of the multivibrator 56 are represented by the waveforms 64 and 66 shown in FIG. 4. The waveform 64 at the Q output is a positive going pulse 0.1 milliseconds wide occuring at the negative peak of the main supply. The reset terminals of the counters 58 and 60 are connected to the output of a flip-flop 68, one input of which is connected to the output of comparator 50 and the other input is connected to a terminal 70 which in turn is connected to the $\overline{Q}$ output of monostable 110 illustrated in FIG. 3. The function of flip-flop 68 is to reset the counters 58 and 60 and shift register 72 on initially turning on the apparatus and the input from the comparator 50 ensures that the resetting of the counters in advance of the zero crossings of the mains supply since the waveform of the voltage comparator 50 leads the mains supply, as illustrated in FIG. 4.

Generally speaking, the function of the counter 58 is to define a load sequence waveform, a period of which is fixed and related to the number of loads N. More particularly, the period is nN times the period of the supply voltage 2. In the present example, N = 10 and the period of the supply voltage is 20 milliseconds and thus the period of the waveform generated by the counter 58 is any multiple of 200 milliseconds. In the simplest arrangement, n = 1 and thus the period is 200 milliseconds. On receipt of a reset pulse from the flip-flop 68 the counter 58 is reset to zero so that it will commence counting of the Q output pulses from the multivibrator 56. When nN pulses have been counted, i.e., 10 in present example, the level at the carry output will be applied to the load input of the other counter 60 and, additionally, the carry output is supplied to the reset input of a flip-flop 62. The output of the flip-flop 62 is connected to the input of an N-bit shift register 72 (which in the illustrated arrangement is shown as two series connected five bit shift registers since these are easier to realize). The shift register 72 is clocked by the Q output pulses from the monostable multivibrator 56 and thus the level appearing at the input of the shift register 72 is clocked through the shift register at the same rate as the main supply but at instants 90° in advance of the zero crossings of the supply voltage. The setting of the flip-flop 62 is controlled by pulses appearing on the carry output of the counter 60. The counter 60 does not commence counting until it receives a load signal from the carry output of the counter 58 and will thereupon begin counting $\overline{Q}$ pulses from the multivibrator 56. Depending upon the initial preset condition of the counter 60, the state of the carry output of the counter 60 will change at an instant which is 90° in advance of a positive going zero crossing of the main supply. That level depends upon the initial states of the load input lines 74 which are loaded into the counter 60 on receipt of a load pulse from the counter 58. Thus, the output waveform appearing at the output of the flip-flop 62 and which clocked through the shift register 72 has a period which is determined by the counter 58 and a pattern within that period determined by the counter 60. As mentioned previously the N stages of the register 72 are connected to inputs of gates 32 so that output pulses from the gates 32 reflect the pattern of the register 72. Of course, since the other inputs of the gates 32 are connected to the monostable circuit 42, the output pulses from the gates 32 are at zero crossings of the mains supply and thus provide two trigger pulses to the SCR's as required.

FIG. 5 shows a typical sequence of states of the shift register 72, the states of the bits of the shift register being shown at intervals which are 20 milliseconds apart, i.e., separated by a full cycle of the mains supply. In this example, the counter 60 is loaded with a BCD number on receipt of a load pulse from the counter 58 thereafter the counter 60 will count $\overline{Q}$ pulses from the monostable 56 until it overflows and produce a carry pulse which will occur before the carry pulse from counter 58. For instance in the illustrated arrangement, the counter 60 is a decade counter and thus the conditions 0100 are loaded into the counter 60 so that it will produce a carry pulse four pulses ahead of the carry pulse from counter 58. On receipt of the carry pulse from counter 60 the flip-flop 62 will be set, (therefore its output will be high) and thus change the condition at the input of the shift register 72 and on receipt of the clock pulse from the Q output of the multivibrator 56 and the high level will be clocked into the first stage of the shift register 72 as indicated in the second row of the diagram of FIG. 5. On receipt of the next three clock pulses high levels will continue to be clocked into the first bit of the shift register 72 as indicated in rows 3 to 5 of the diagram. On receipt of the next pulse, defining the beginning of a new period, the counter 58 produces a carry signal on its carry output to reset the flip-flop 62 and thus input a low level to the first bit of the shift register 72. The low level will remain present for the next six pulses as determined by the presetting of the counter 60 and thus the same sequence will continue to be clocked through the shift register 72 so long as the reset flip-flop 68 is not activated or the levels on the load inputs to the counter 60 are not altered.

Figure 6:
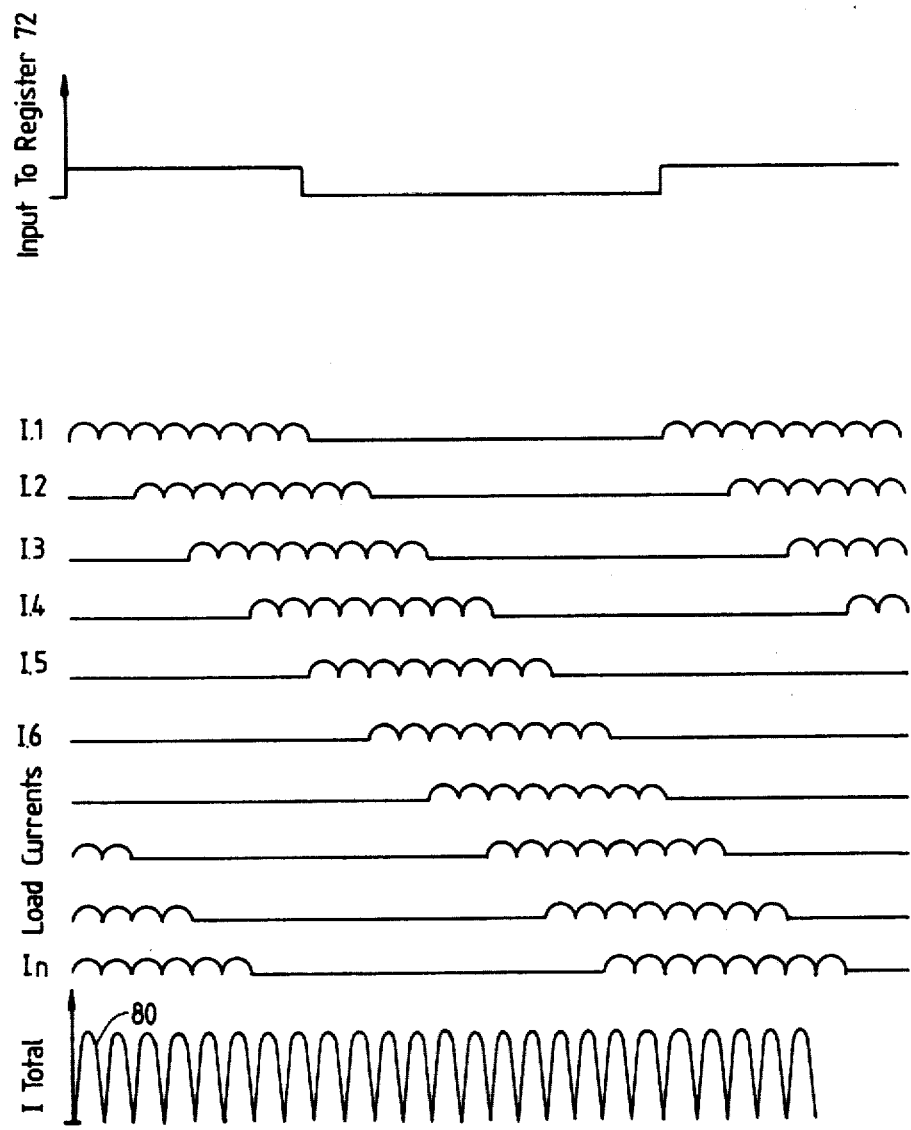
FIG. 6 illustrates an example of the waveforms of the currents $I_1$ and $I_N$ flowing through the loads $R_1$ to $R_N$.

Output from the respective bits of the shift register 62 are connected to respective inputs of the NAND gates 32. As described previously, other inputs of the NAND gates 32 are connected to the output of the multi-vibrator 42 which produces a train of clock pulses which occur at zero crossings of the main supply. Since the shift register 72 is clocked by pulses which are 90° in advance of the zero crossings of the main supply, the arrangement is such that race conditions will not be present at the inputs to the NAND gates 32, i.e. all input levels derived from the shift register 72 will change before the pulses arrive from the multivibrator 42 which are in synchronism with the mains supply. The pattern of outputs at the terminals $T_1$ to $T_N$ of the NAND gates 32 is similar to that illustrated in FIG. 5, except that there are two pulses during each period of the main supply, and consequently the firing of the SCR's will also follow this pattern, as illustrated in FIG. 6. In this diagram, the currents $I_1$ to $I_N$ illustrate the currents flowing in the loads $R_1$ to $R_N$ and it will be seen that the arrangement is such that the sum of the currents $I_1$ to $I_N$ is a uniform rectified sinusoidal waveform 80.

Figure 7:
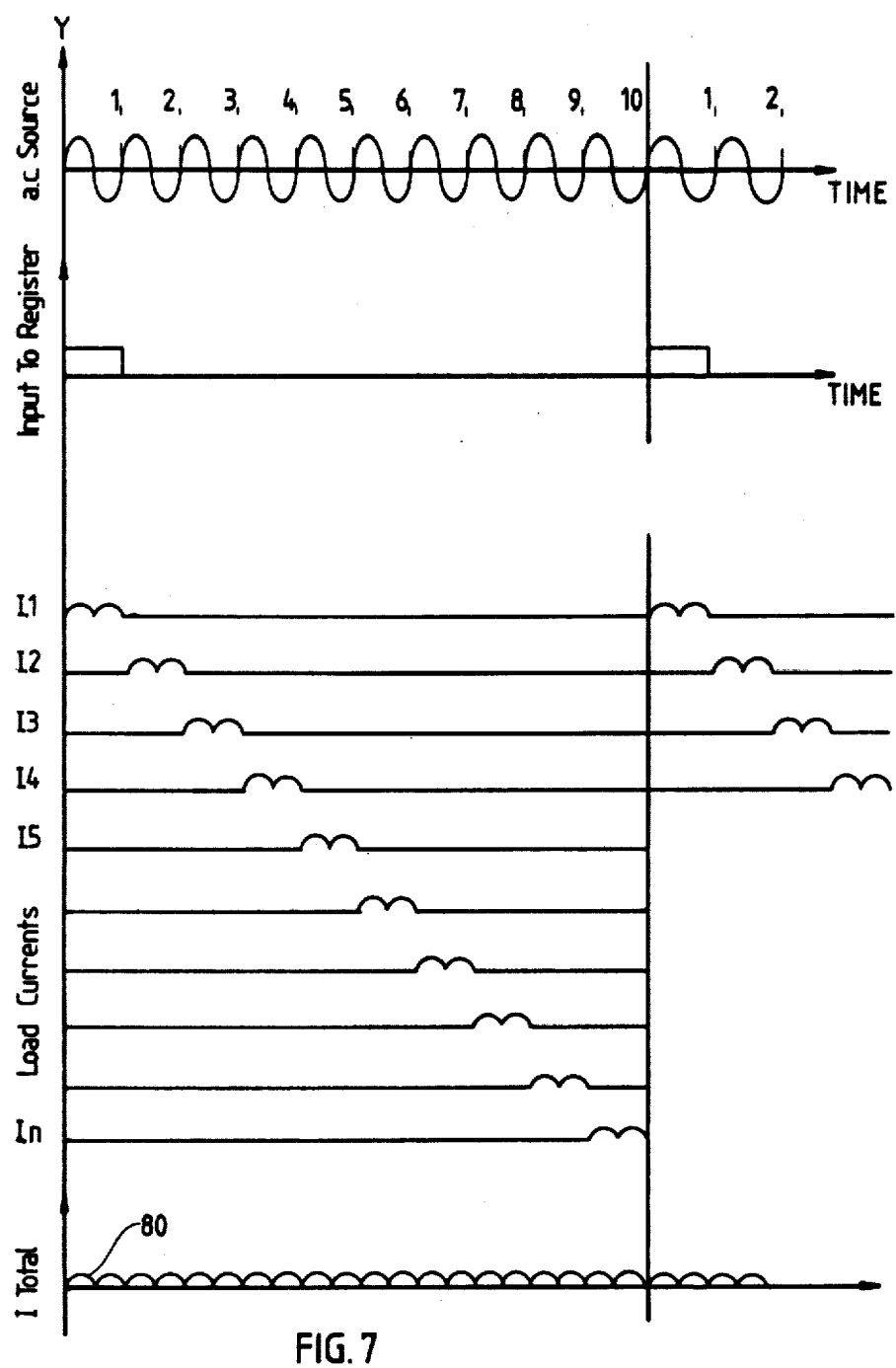
FIG. 7 is a similar diagram to FIG. 6 but showing the currents at a different duty cycle.

In the example of FIGS. 5 and 6, the counter 60 is preset so as to maintain each of the SCR's conducting for four full cycles of the supply so that the duty cycle of each load is 0.4 and the total power into the loads is 0.4 times the maximum power. FIG. 7 illustrates an example where power level 1 is set into the counter 60 so that only one power firing cycle is clocked through the shift register 72 and thus each of the SCR's is conducting each tenth cycle of the ac supply.

It will be appreciated that for the sum of the currents $I_1$ to $I_N$ to be uniform there must be no periods during which no current is flowing, i.e., the current in one of the loads must begin to flow while current is still flowing in the preceding load or has just terminated in the preceding load. Further, the waveform generated by the counter 58 is chosen to be nN times the period of the ac supply, the successive currents $I_1$ to $I_N$ in the loads will need to be initiated at instants which are n cycles of the mains supply apart and, in order to meet the previously noted constraint, each current I must flow for at least n full cycles of mains supply. It is possible, of course, to arrange for each of the loads to be continuously conducting in which case a high level is continuously maintained at the input to the shift register 72. In this condition, it is preferred to sense the loading of the maximum power level onto the load input lines of the counter 60 by means of a gate 82 and apply the output of the gate to an override input to the flip-flop 62 whereupon the input to the shift register 72 is continuously held high.

Figure 3:
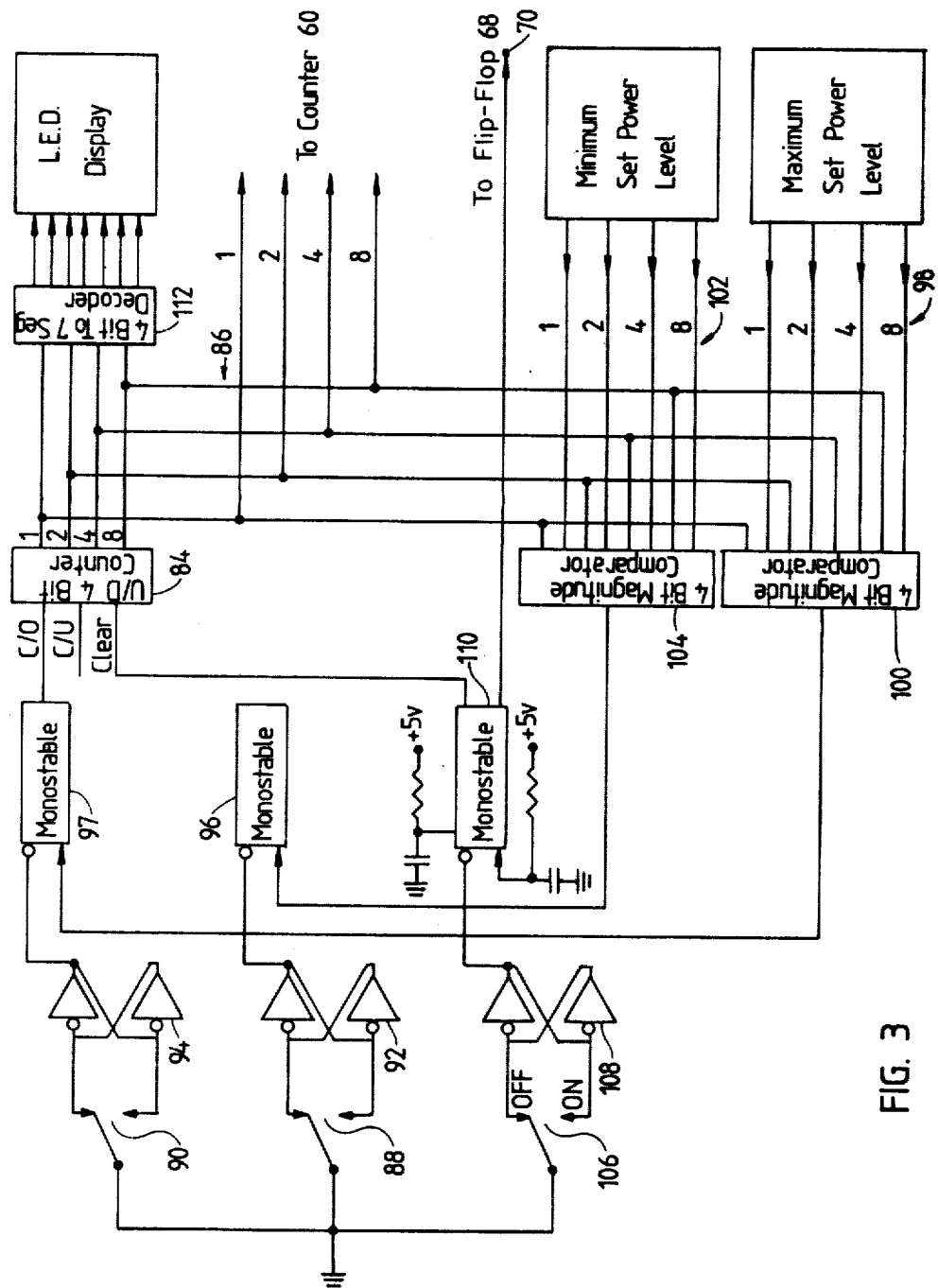
FIG. 3 is a circuit diagram showing a preferred form of power lever adjusting circuitry used as the input to the circuit shown in FIG. 2.

The preferred arrangement for setting the power level or effective duty cycle of the loads is illustrated in FIG. 3. In this arrangement, the output levels from a four bit up-down counter 84 are applied to the load input terminals of the counter 60 via lines 86. The circuit includes a power raise button 88 and a power lower button 90 connected to respective flip-flops 92 and 94. The output from the flip-flop 92 is connected to a monostable multivibrator 96 the output of which is in turn connected to the count-up input of the counter 84 and the arrangement is such that when the power raise button 88 is pressed a pulse is generated in the monostable circuit 96 and this increases the count in the counter 84 which affects the input levels loaded into the counter 60 to thus increase the effective duty cycle of the loads. If the power raise button is pressed again a further pulse will be generated and so further increase the effective power up until the stage when the loads are continuously energised. On the other hand, the output of the power lower flip-flop 94 is connected to a monostable circuit 97 which in turn is connected to the count-down terminal of the counter 84 and thus each time the power lower button 90 is pressed the count in the counter 85 is reduced so as to reduce the effective duty cycle of the loads.

In the illustrated arrangement, the monostable circuits 96 and 97 have inhibit terminals to effectively set the maximum and minimum power levels which can be attained by operation of the buttons 88 and 90. The minimum power level is determined by applying binary coded levels to input lines 98 to a four bit magnitude comparator 100, the other inputs of which are connected the lines 86 from the output of the counter 84. When the comparator 100 senses a condition in which the levels set on the input lines 98 equals the levels on the lines 86 a pulse will be produced which is applied to the inhibit input of the monostable 97 and thus preventing any further decrease in the count of the counter 84. Similarly, the maximum level is set according to the pattern of levels set on lines 102 which are applied to inputs of a second four-bit magnitude comparator 104 which in turn is connected to the inhibit terminal of the monostable multivibrator 96.

The circuit further includes an emergency off switch 106 which is connected to a flip-flop 108 the output of which is in turn connected to a monostable circuit 110. The output from the monostable 110 is connected to the clear terminal of the counter 84 which will thus give a zero reading in that counter which in turn has the effect of presetting the counter 60 such that no enabling levels are applied to the input of the shift register 72 and thus none of the SCR's will be triggered. In addition, output from the monostable 110 is used to reset the flip-flop 68 which in turn clears the counters 58, 60 and the shift register 72 in readiness for the next operation of the circuitry. The RC networks connected to the monostable 110 are arranged so as to enable the monostable 110 to produce a pulse when the power is first applied to the circuitry, thus zeroing all counters and shift registers.

It is convenient to apply the output lines 86 to a display decoder 112 for displaying the power level which has been selected.

The circuitry is equally applicable to three phase mains supplies as is to single phase supplies. In the case of a three phase supply, the circuitry of FIGS. 1 and 2 is provided for each phase. It is convenient to use the selecting circuitry illustrated in FIG. 3 for controlling each of the phases. In this way, the same levels on the output lines 86 can be applied to each of the counters 60 for the three phases so that the power level in each phase is the same and further, the output from monostable 110 is applied to the reset terminal 70 of the flip-flop 68 for each phase, thus ensuring that on receipt of the first pulse from the voltage comparator 50 in each phase that phase will then commence operation. This ensures that the correct phase relationship is maintained between the phases of the supply.

Many modifications will be apparent to those skilled in the art without departing from the spirit and scope of the invention.

I claim:

1. A method of supplying current to a fixed number of N electrical loads each associated with switching means, from an arc source comprising the steps of generating a repetitive load firing pattern having a period of nN full cycles of the ac source where n is any positive integer, and applying said pattern to said switching means so as to control the total current drawn from said ac source, the load pattern being such that (a) the currents in each of the loads are successively initiated at instants in time which are separated by n full cycles of the ac source, and (b) the current in each load is maintained for d full cycles of the ac source, where d is a selectable duty factor and is selected to be any positive integer equal to or greater than n, but less than or equal to nN, whereby after nN full cycles of said ac source the total current drawn from the ac source is variable in magnitude in accordance with the selected value of d, is sinusoidal and is equal to dI/n.

2. A method as claimed in claim 1 where n equals 1.

3. A method as claimed in claims 1 or 2 wherein the electrical loads comprise resistive loads of equal value, each being connected in series with a respective SCR, and wherein the load firing pattern comprises electric trigger signals which are coupled to trigger said SCR's.

4. A circuit for supplying current to N electrical loads ($R_1$-$R_N$) from an ac source of frequency fHz, comprising a plurality of switching elements ($SCR_1$-$SCR_N$) couplable between the source and loads, generating means (58, 60, 62, 32, 72) for generating a repetitive load firing pattern having a period of nN full cycles of the ac source where n is any positive integer, means (16) to couple said pattern to said switching means for initiating, in accordance with said pattern, the flow of a current I in each load, the generating means being arranged to generate said pattern so as to (a) successively render the elements conductive at instants in time which are separated by n full cycles of the ac source whereby currents I are successively initiated in each of said N loads, and (b) maintain the elements conductive for d full cycles of the ac source where d is a selectable duty factory and is greater than or equal to n, but less than or equal to nN whereby after nN full cycles of said ac source the total current from the source to the N loads is variable in magnitude in accordance with the selected value of d, is sinusoidal and is equal to dI/n.

5. A circuit as claimed in claim 4, wherein said switching elements comprise respective SCR's ($SCR_1$-$SCR_N$) and said means (16) to couple comprise respective triggering circuits for said SCR's, and wherein said generating means includes a plurality of gates (32) and an N-bit shift register (72), one input of each of said gates being clocked in synchronism with zero crossings of said source and another input of each of said gates being coupled to a respective stage of said N-bit shift register, trigger signals being derived from the outputs of said gates and applied to said triggering circuits.

6. A circuit as claimed in claim 5 wherein the generating means further includes first counting means (58) for generating at its carry output carry pulses at a period of N full cycles of said ac source, second counting means (60) the load input of which is coupled to the carry output of the first counting means, and a flip-flop circuit (62) having inputs coupled to the outputs of first and second counting means, the output of said flip-flop being coupled to the input of said N bit shift register.

7. A circuit as claimed in claim 6 wherein the generating means further includes a presettable load duty storage device (84) which is coupled to preset inputs of the second counting means and operable to preset the second counting means on receipt of a carry pulse by the second counting means, the state to which the second counting means is preset being determined by a duty factor d set into said load duty storage device.

8. A circuit as claimed in claim 7, wherein said generating means further includes a monostable circuit (56) which is clocked by pulses of frequency fHz but leading in phase relative to said source, said monostable circuit having Q and $\overline{Q}$ outputs which are connected to the inputs of said first and second counting means, respectively.

9. A circuit as claimed in claim 8 wherein the Q output of said monostable circuit is coupled to said N bit shift register to thereby clock said register at a frequency fHz but leading in phase relative to said source.

10. A circuit as claimed in claim 4, wherein said repetitive load firing pattern is synchronized with said ac source.

11. A method as claimed in claim 1, wherein said load firing pattern is synchronized with said ac source.

* * * * *